(12) United States Patent
Okado et al.

(10) Patent No.: US 11,769,904 B2
(45) Date of Patent: Sep. 26, 2023

(54) NONAQUEOUS ELECTROLYTE SECONDARY BATTERY

(71) Applicant: PRIME PLANET ENERGY & SOLUTIONS, INC., Tokyo (JP)

(72) Inventors: Tetsuya Okado, Kako-gun (JP); Hirofusa Tanaka, Kasai (JP); Masashi Muraoka, Kakogawa (JP); Kazuki Takeno, Takasago (JP); Mio Nosaka, Miki (JP)

(73) Assignee: Prime Planet Energy & Solutions, Inc., Tokyo (JP)

( * ) Notice: Subject to any disclaimer, the term of this patent is extended or adjusted under 35 U.S.C. 154(b) by 106 days.

(21) Appl. No.: 17/373,049

(22) Filed: Jul. 12, 2021

(65) Prior Publication Data

US 2022/0052373 A1 Feb. 17, 2022

(30) Foreign Application Priority Data

Aug. 11, 2020 (JP) .................................. 2020-135765

(51) Int. Cl.
*H01M 10/0525* (2010.01)
*H01M 4/587* (2010.01)
(Continued)

(52) U.S. Cl.
CPC ....... *H01M 10/0525* (2013.01); *H01M 4/587* (2013.01); *H01M 2004/027* (2013.01); *H01M 2010/4292* (2013.01)

(58) Field of Classification Search
CPC ....... H01M 10/0525; H01M 2004/027; H01M 2010/4292; H01M 4/587
See application file for complete search history.

(56) References Cited

U.S. PATENT DOCUMENTS

| 2008/0118837 A1 | 5/2008 | Shirane et al. |
| 2013/0101899 A1 | 4/2013 | Kajita et al. |
| (Continued) | | |

FOREIGN PATENT DOCUMENTS

| CN | 101160685 A | 4/2008 |
| CN | 102947988 A | 2/2013 |
| (Continued) | | |

*Primary Examiner* — Wyatt P McConnell
(74) *Attorney, Agent, or Firm* — Finnegan, Henderson, Farabow, Garrett & Dunner, LLP.

(57) ABSTRACT

A nonaqueous electrolyte secondary battery includes an electrode assembly and an electrolyte solution. The electrode assembly is impregnated with at least part of the electrolyte solution. The electrode assembly includes a positive electrode, a negative electrode, and a separator. The separator separates the positive electrode and the negative electrode from each other. The negative electrode includes a negative electrode active material. The negative electrode active material includes graphite. The following relation of a formula (1) is satisfied: "$1.60 \leq NPR/AAR \leq 2.55$". "NPR" represents a ratio of a negative electrode charging capacity to a positive electrode charging capacity. "AAR" represents a ratio of an effective discharging capacity of the negative electrode to a total of a capacity corresponding to an amount of inactive lithium adhered to the negative electrode and the effective discharging capacity of the negative electrode.

2 Claims, 14 Drawing Sheets

(51) Int. Cl.
  *H01M 4/02* (2006.01)
  *H01M 10/42* (2006.01)

(56) References Cited

U.S. PATENT DOCUMENTS

| | | | |
|---|---|---|---|
| 2013/0280594 | A1 | 10/2013 | Kajita et al. |
| 2015/0155555 | A1 | 6/2015 | Yamamoto et al. |
| 2020/0235419 | A1* | 7/2020 | Chae .................. H01M 4/0447 |

FOREIGN PATENT DOCUMENTS

| | | | |
|---|---|---|---|
| CN | 103299472 | A | 9/2013 |
| CN | 104508893 | A | 4/2015 |
| CN | 110214387 | A | 9/2019 |
| EP | 3 128 595 | A1 | 2/2017 |
| EP | 3 565 035 | A2 | 11/2019 |
| JP | 2002-203608 | A | 7/2002 |
| JP | 2011-028883 | A | 2/2011 |
| JP | 2017-199510 | A | 11/2017 |
| WO | WO 2014/021014 | A1 | 2/2014 |
| WO | WO 2015/019851 | A1 | 2/2015 |
| WO | WO 2019/013500 | A2 | 1/2019 |

\* cited by examiner

FIG. 14

NPR/AAR Map

Negative Electrode Effective Utilization Ratio
AAR = QDa/(Ql+QDa)

Positive/Negative Capacity Ratio NPR = QCa/QCc

| NPR/AAR | 0.30 | 0.35 | 0.40 | 0.45 | 0.50 | 0.55 | 0.60 | 0.65 | 0.70 | 0.75 | 0.80 | 0.85 | 0.90 | 0.95 | 1.00 |
|---|---|---|---|---|---|---|---|---|---|---|---|---|---|---|---|
| 1.00 | 3.33 | 2.86 | 2.50 | 2.22 | 2.00 | 1.82 | 1.67 | 1.54 | 1.43 | 1.33 | 1.25 | 1.18 | 1.11 | 1.05 | 1.00 |
| 1.05 | 3.50 | 3.00 | 2.63 | 2.33 | 2.10 | 1.91 | 1.75 | 1.62 | 1.50 | 1.40 | 1.31 | 1.24 | 1.17 | 1.11 | 1.05 |
| 1.10 | 3.67 | 3.14 | 2.75 | 2.44 | 2.20 | 2.00 | 1.83 | 1.69 | 1.57 | 1.47 | 1.38 | 1.29 | 1.22 | 1.16 | 1.10 |
| 1.15 | 3.83 | 3.29 | 2.88 | 2.56 | 2.30 | 2.09 | 1.92 | 1.77 | 1.64 | 1.53 | 1.44 | 1.35 | 1.28 | 1.21 | 1.15 |
| 1.20 | 4.00 | 3.43 | 3.00 | 2.67 | 2.40 | 2.18 | 2.00 | 1.85 | 1.71 | 1.60 | 1.50 | 1.41 | 1.33 | 1.26 | 1.20 |
| 1.25 | 4.17 | 3.57 | 3.13 | 2.78 | 2.50 | 2.27 | 2.08 | 1.92 | 1.79 | 1.67 | 1.56 | 1.47 | 1.39 | 1.32 | 1.25 |
| 1.30 | 4.33 | 3.71 | 3.25 | 2.89 | 2.60 | 2.36 | 2.17 | 2.00 | 1.86 | 1.73 | 1.63 | 1.53 | 1.44 | 1.37 | 1.30 |
| 1.35 | 4.50 | 3.86 | 3.38 | 3.00 | 2.70 | 2.45 | 2.25 | 2.08 | 1.93 | 1.80 | 1.69 | 1.59 | 1.50 | 1.42 | 1.35 |
| 1.40 | 4.67 | 4.00 | 3.50 | 3.11 | 2.80 | 2.55 | 2.33 | 2.15 | 2.00 | 1.87 | 1.75 | 1.65 | 1.56 | 1.47 | 1.40 |
| 1.45 | 4.83 | 4.14 | 3.63 | 3.22 | 2.90 | 2.64 | 2.42 | 2.23 | 2.07 | 1.93 | 1.81 | 1.71 | 1.61 | 1.53 | 1.45 |
| 1.50 | 5.00 | 4.29 | 3.75 | 3.33 | 3.00 | 2.73 | 2.50 | 2.31 | 2.14 | 2.00 | 1.88 | 1.76 | 1.67 | 1.58 | 1.50 |
| 1.55 | 5.17 | 4.43 | 3.88 | 3.44 | 3.10 | 2.82 | 2.58 | 2.38 | 2.21 | 2.07 | 1.94 | 1.82 | 1.72 | 1.63 | 1.55 |
| 1.60 | 5.33 | 4.57 | 4.00 | 3.56 | 3.20 | 2.91 | 2.67 | 2.46 | 2.29 | 2.13 | 2.00 | 1.88 | 1.78 | 1.68 | 1.60 |
| 1.65 | 5.50 | 4.71 | 4.13 | 3.67 | 3.30 | 3.00 | 2.75 | 2.54 | 2.36 | 2.20 | 2.06 | 1.94 | 1.83 | 1.74 | 1.65 |
| 1.70 | 5.67 | 4.86 | 4.25 | 3.78 | 3.40 | 3.09 | 2.83 | 2.62 | 2.43 | 2.27 | 2.13 | 2.00 | 1.89 | 1.79 | 1.70 |
| 1.75 | 5.83 | 5.00 | 4.38 | 3.89 | 3.50 | 3.18 | 2.92 | 2.69 | 2.50 | 2.33 | 2.19 | 2.06 | 1.94 | 1.84 | 1.75 |
| 1.80 | 6.00 | 5.14 | 4.50 | 4.00 | 3.60 | 3.27 | 3.00 | 2.77 | 2.57 | 2.40 | 2.25 | 2.12 | 2.00 | 1.89 | 1.80 |
| 1.85 | 6.17 | 5.29 | 4.63 | 4.11 | 3.70 | 3.36 | 3.08 | 2.85 | 2.64 | 2.47 | 2.31 | 2.18 | 2.06 | 1.95 | 1.85 |
| 1.90 | 6.33 | 5.43 | 4.75 | 4.22 | 3.80 | 3.45 | 3.17 | 2.92 | 2.71 | 2.53 | 2.38 | 2.24 | 2.11 | 2.00 | 1.90 |
| 1.95 | 6.50 | 5.57 | 4.88 | 4.33 | 3.90 | 3.55 | 3.25 | 3.00 | 2.79 | 2.60 | 2.44 | 2.29 | 2.17 | 2.05 | 1.95 |
| 2.00 | 6.67 | 5.71 | 5.00 | 4.44 | 4.00 | 3.64 | 3.33 | 3.08 | 2.86 | 2.67 | 2.50 | 2.35 | 2.22 | 2.11 | 2.00 |
| 2.05 | 6.83 | 5.86 | 5.13 | 4.56 | 4.10 | 3.73 | 3.42 | 3.15 | 2.93 | 2.73 | 2.56 | 2.41 | 2.28 | 2.16 | 2.05 |
| 2.10 | 7.00 | 6.00 | 5.25 | 4.67 | 4.20 | 3.82 | 3.50 | 3.23 | 3.00 | 2.80 | 2.63 | 2.47 | 2.33 | 2.21 | 2.10 |
| 2.15 | 7.17 | 6.14 | 5.38 | 4.78 | 4.30 | 3.91 | 3.58 | 3.31 | 3.07 | 2.87 | 2.69 | 2.53 | 2.39 | 2.26 | 2.15 |
| 2.20 | 7.33 | 6.29 | 5.50 | 4.89 | 4.40 | 4.00 | 3.67 | 3.38 | 3.14 | 2.93 | 2.75 | 2.59 | 2.44 | 2.32 | 2.20 |

NONAQUEOUS ELECTROLYTE SECONDARY BATTERY

This nonprovisional application is based on Japanese Patent Application No. 2020-135765 filed on Aug. 11, 2020, with the Japan Patent Office, the entire contents of which are hereby incorporated by reference.

BACKGROUND OF THE INVENTION

Field of the Invention

The present disclosure relates to a nonaqueous electrolyte secondary battery.

Description of the Background Art

Japanese Patent Laying-Open No. 2002-203608 discloses a vehicle nonaqueous secondary battery in which a ratio of a positive electrode capacity to a negative electrode capacity is 0.6 to 0.9.

SUMMARY OF THE INVENTION

A nonaqueous electrolyte secondary battery (hereinafter, also simply referred to as "battery") is used in various manners depending on its purpose of use. For example, when the battery is used as a main electric power supply, a motive power assisting electric power supply, or the like for an electrically powered vehicle, high-rate charging and high-rate discharging may be performed alternately. Hereinafter, such a manner of use is also referred to as "high-rate charging/discharging".

An SOC (state of charge) represents the percentage of a value obtained by dividing the charging capacity of the battery by the full charging capacity of the battery. After continuously repeating the high-rate charging/discharging at a high SOC, a battery output may be temporarily decreased. The decreased output is temporary and the output will be restored in many cases. However, the output is desirably stable before and after the high-rate charging/discharging.

It is an object of the present disclosure to suppress a decreased output after repeating high-rate charging/discharging at a high SOC.

Hereinafter, technical configuration, function and effect of the present disclosure will be described. However, the mechanism of the function of the present disclosure includes a presumption. The scope of claims are not limited by whether or not the mechanism of the function is correct.

[1] A nonaqueous electrolyte secondary battery includes an electrode assembly and an electrolyte solution. The electrode assembly includes a positive electrode, a negative electrode, and a separator. The separator separates the positive electrode and the negative electrode from each other. The negative electrode includes a negative electrode active material. The negative electrode active material includes graphite.

The following relation of a formula (1) is satisfied:

$$1.60 \leq NPR/AAR \leq 2.55 \quad (1).$$

In the formula (1), "NPR" represents a ratio of a negative electrode charging capacity to a positive electrode charging capacity. "AAR" represents a ratio of an effective discharging capacity of the negative electrode to a total of a capacity corresponding to an amount of inactive lithium adhered to the negative electrode and the effective discharging capacity of the negative electrode.

FIG. 1 is a graph showing charging stage structures of graphite.

Conventionally, graphite has been used as the negative electrode active material. A graphite crystal is formed by graphene sheets (GS) being stacked. Lithium ions ($Li^+$) are intercalated in gaps between the graphene sheets. It has been known that graphite has a plurality of charging stage structures. The horizontal axis of the graph in FIG. 1 represents a charging state. The vertical axis of the graph in FIG. 1 represents a potential of the negative electrode. Graphite is in one of four charging stage structures depending on an amount of intercalated $Li^+$ (i.e., charging amount). As the amount of intercalated $Li^+$ is increased, the charging stage structure is transitioned in order of a fourth stage structure ($St_4$), a third stage structure ($St_3$), a second stage structure ($St_2$), and a first stage structure ($St_1$). As the amount of intercalated $Li^+$ is increased, graphite is expanded. Therefore, the volume of the electrode assembly is increased in accordance with the SOC.

FIG. 2 is a graph showing an exemplary correspondence between reaction force and the SOC.

The horizontal axis of FIG. 2 represents the SOC. The vertical axis of FIG. 2 represents a differentiation (dF/dSOC) of the reaction force (F) by the SOC. The reaction force represents force with which the electrode assembly presses a battery case (housing) when the battery is constrained in a predetermined dimension. It is considered that a change in reaction force reflects a change in volume of the electrode assembly. dF/dSOC exhibits a characteristic change in accordance with the SOC. In accordance with the correspondence between the SOC of the battery and the charging stage structure of the negative electrode, a correspondence between the charging stage structure and dF/dSOC is derived.

According to a novel finding in the present disclosure, it is observed that dF/dSOC tends to be small in the second stage structure ($St_2$) (see FIG. 2). That is, when the charging stage structure of graphite is the second stage structure ($St_2$), the change in reaction force tends to be relatively small. On the other hand, when the charging stage structure of graphite is the first, third, or fourth stage structure ($St_1$, $St_3$, or $St_4$), the change in reaction force tends to be relatively large. This phenomenon can explain the above-described decreased output after the high-rate charging/discharging. That is, in a high SOC range (SOC range from 70% to 90%), graphite is in the first stage structure ($St_1$). When the high-rate charging/discharging is repeated in the SOC range of 70% to 90%, rapid increase and rapid decrease in volume of the electrode assembly are repeated. This is presumably because the change in volume of graphite is large in the first stage structure ($St_1$) (see FIG. 2). The electrode assembly is impregnated with the electrolyte solution. The repeated rapid increase and decrease in volume of the electrode assembly causes the electrode assembly to be moved like a pump. As a result, the electrolyte solution is considered to be ejected from the electrode assembly. The ejection of the electrolyte solution leads to shortage of the electrolyte solution required for output, thus presumably resulting in the temporarily decreased output.

In the battery of the present disclosure, by specifying the range of "NPR/AAR" as shown in the above formula (1), it is expected to suppress the decreased output after repeating the high-rate charging/discharging at the high SOC.

"NPR" is also described as "positive/negative capacity ratio". "NPR" is calculated by dividing the negative electrode charging capacity by the positive electrode charging capacity. According to the novel finding of the present disclosure, as "NPR" is larger, a boundary between the third stage structure ($St_3$) and the second stage structure ($St_2$) is shifted to the higher SOC side.

"AAR" is also described as "negative electrode effective utilization ratio". "AAR" is calculated by dividing the effective discharging capacity of the negative electrode by the total of the capacity corresponding to the amount of inactive lithium adhered to the negative electrode and the effective discharging capacity of the negative electrode. According to the novel finding of the present disclosure, as "AAR" is larger, a boundary between the second stage structure ($St_2$) and the first stage structure ($St_1$) is shifted to the lower SOC side.

Therefore, an SOC range corresponding to the second stage structure ($St_2$) can be adjusted by a balance between "NPR" and "AAR". When "NPR/AAR" is more than or equal to 1.60 and less than or equal to 2.55, it is considered that the graphite can be in the second stage structure ($St_2$) at an SOC of 70% to 90%. In the second stage structure ($St_2$), it is considered that the changes in volumes of the graphite and the electrode assembly are small (see FIG. 2). Therefore, even when the high-rate charging/discharging is repeated in the SOC range of 70% to 90%, a predetermined amount of the electrolyte solution can be maintained in the electrode assembly. As a result, it is considered that the temporarily decreased output is suppressed.

When "NPR/AAR" is more than 2.55, the graphite may be in the third stage structure ($St_3$) in the SOC range of 70% to 90%. Since the changes in volumes of the graphite and the electrode assembly are large, it is considered that the temporarily decreased output is likely to occur. On the other hand, when "NPR/AAR" is less than 1.60, the graphite may be in the first stage structure ($St_1$) in the SOC range of 70% to 90%. Also in this case, since the changes in volumes of the graphite and the electrode assembly are large, it is considered that the temporarily decreased output is likely to occur.

[2] In the nonaqueous electrolyte secondary battery according to [1], the following relations of formulae (2) and (3) may be further satisfied:

$$1.45 \leq NPR \leq 1.90 \quad (2); \text{ and}$$

$$0.75 \leq AAR \leq 0.90 \quad (3).$$

[3] In the nonaqueous electrolyte secondary battery according to [1], the following relations of formulae (4) and (5) may be further satisfied:

$$1.05 \leq NPR \leq 1.40 \quad (4); \text{ and}$$

$$0.55 \leq AAR \leq 0.65 \quad (5).$$

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 14 shows a "NPR/AAR" map in Table 1.

DESCRIPTION OF THE PREFERRED EMBODIMENTS

Hereinafter, an embodiment of the present disclosure (hereinafter, also referred to as "the present embodiment") will be described. However, the scope of claims is not limited by the description below.

In the present embodiment, the description "consisting essentially of" indicates that an additional component can be included in addition to an essential component to such an extent that the object of the present disclosure is not hindered. For example, a normally imaginable component in the technical field (such as an inevitable impurity) can be of course included.

In the present embodiment, when a compound is expressed by a stoichiometric composition formula such as "$LiCoO_2$", the stoichiometric composition formula merely indicates a representative example. For example, when a lithium cobaltate is expressed as "$LiCoO_2$", the lithium cobaltate is not limited to a composition ratio of "Li/Co/O=1/1/2", and can include Li, Co, and O at any composition ratio.

In the present embodiment, for example, a description such as "1.60 to 2.55" represents a range including the boundary values unless otherwise stated particularly. For example, the description "1.60 to 2.55" represents a range of "more than or equal to 1.60 and less than or equal to 2.55".

In the present embodiment, a result of division calculation is effective up to the second decimal places. The third and subsequent decimal places are rounded off.

<Nonaqueous Electrolyte Secondary Battery>

Figure 1:
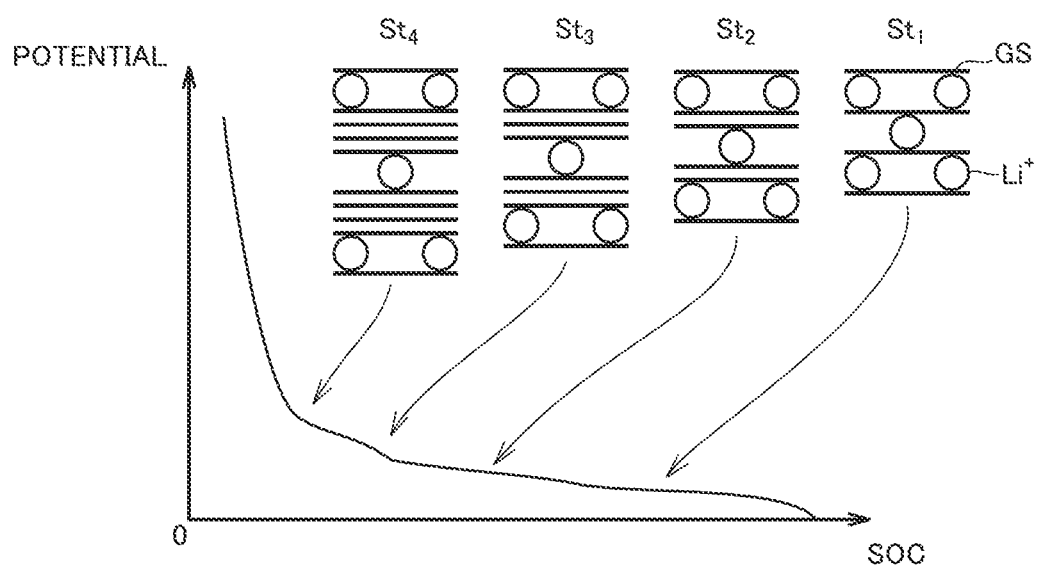
FIG. 1 is a graph showing charging stage structures of graphite.
Figure 2:
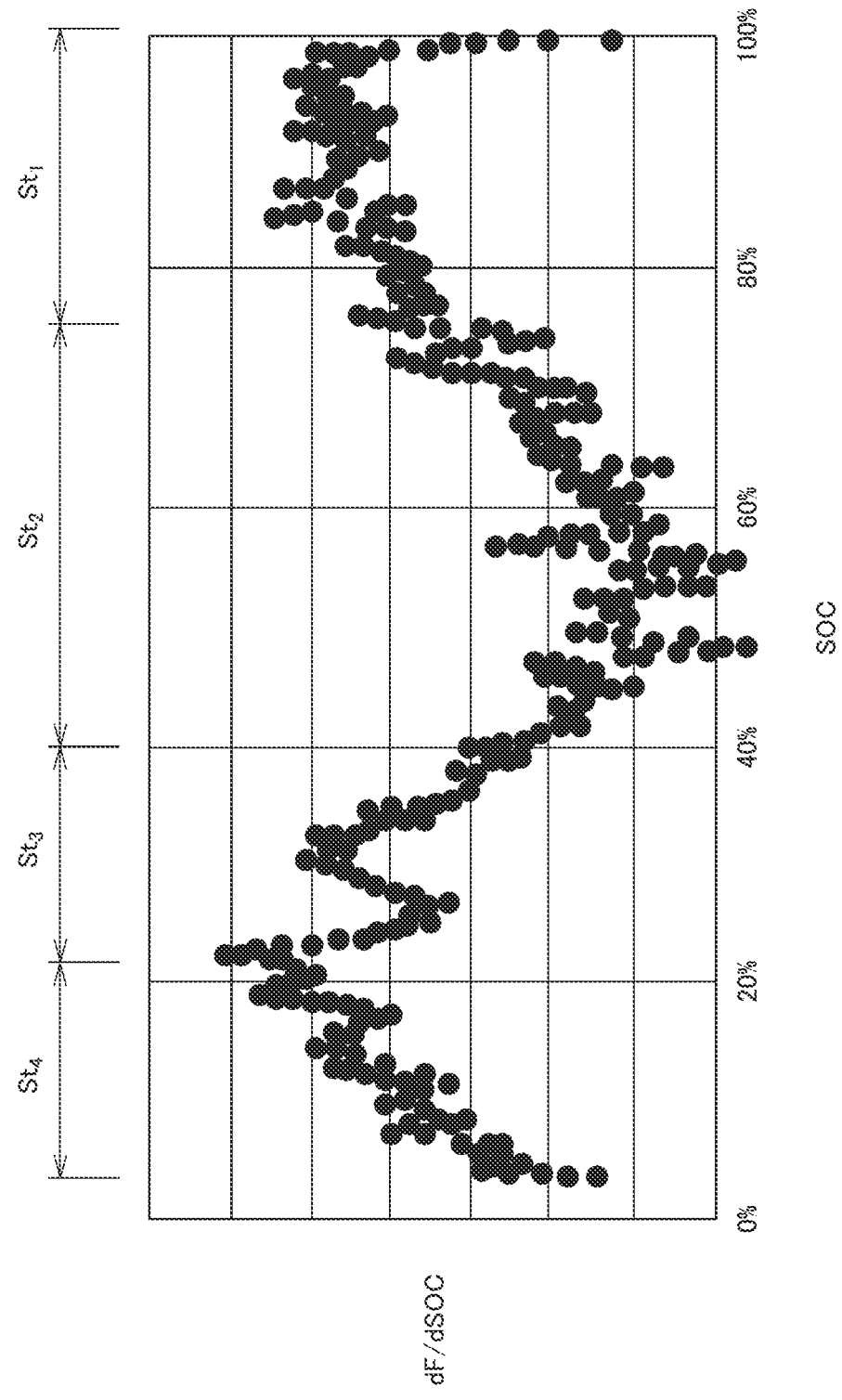
FIG. 2 is a graph showing an exemplary correlation between reaction force and an SOC.
Figure 3:
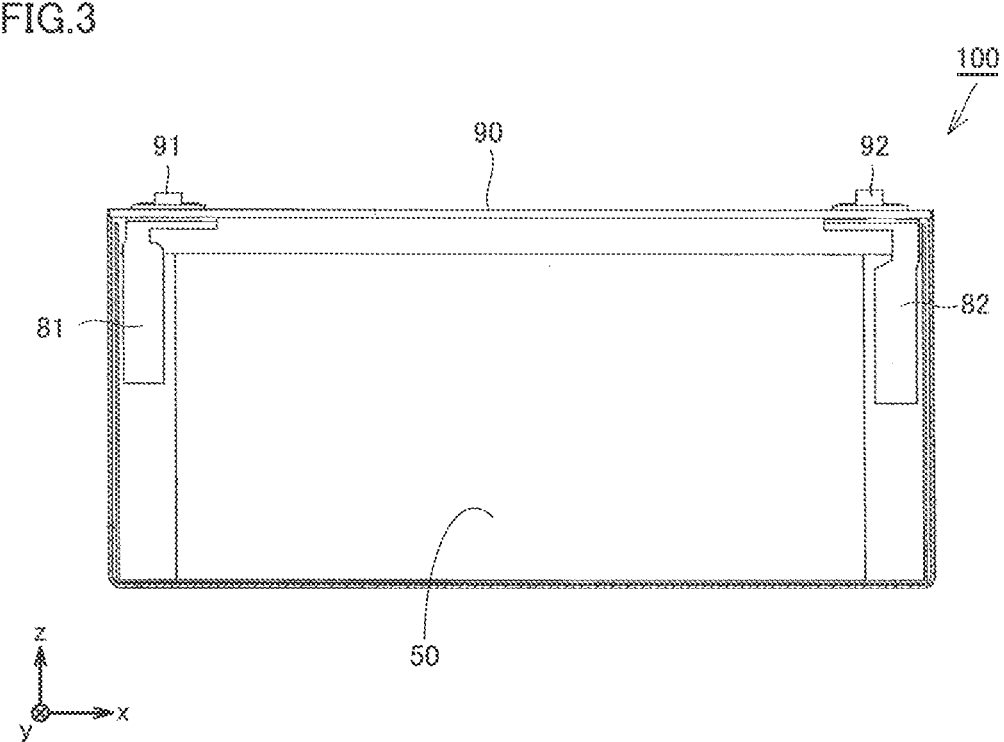
FIG. 3 is a schematic diagram showing an exemplary nonaqueous electrolyte secondary battery according to the present embodiment.

FIG. 3 is a schematic diagram showing an exemplary nonaqueous electrolyte secondary battery according to the present embodiment.

A battery 100 includes a battery case 90. Battery case 90 has a prismatic shape. However, the prismatic shape is exemplary. Battery case 90 can have any external shape. Battery case 90 may have a cylindrical shape, for example. Battery case 90 stores an electrode assembly 50 and an electrolyte solution (not shown). That is, battery 100 includes electrode assembly 50 and the electrolyte solution. Electrode assembly 50 is connected to a positive electrode terminal 91 by a positive electrode current collecting member 81. Electrode assembly 50 is connected to a negative electrode terminal 92 by a negative electrode current collecting member 82.

<<Electrode Assembly>>

Figure 4:
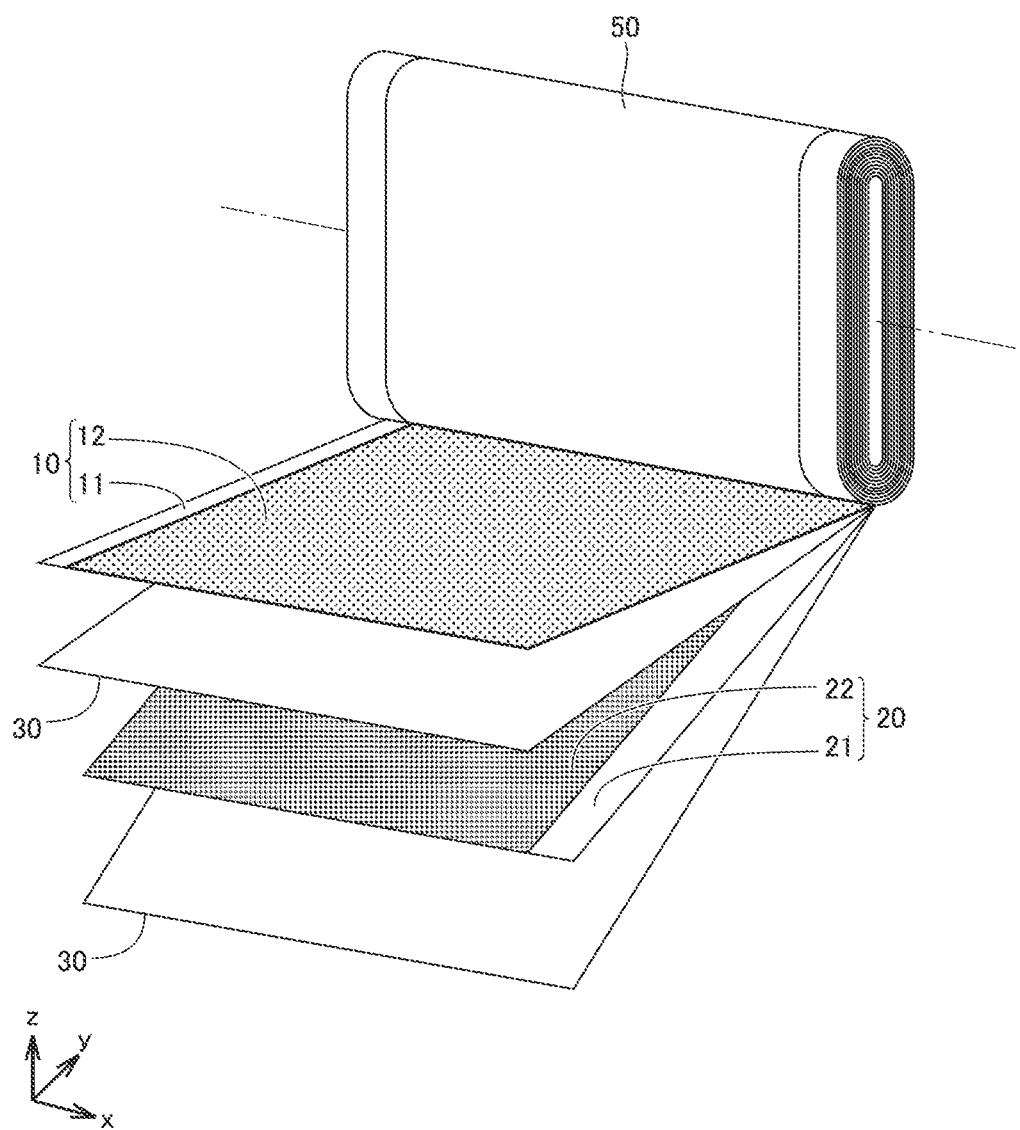
FIG. 4 is a schematic view showing an exemplary electrode assembly in the present embodiment.

FIG. 4 is a schematic view showing an exemplary electrode assembly in the present embodiment.

Electrode assembly 50 includes a positive electrode 10, a negative electrode 20, and separator(s) 30. Each of positive electrode 10, negative electrode 20, and separator(s) 30 is in the form of a sheet. Electrode assembly 50 of FIG. 4 is of a winding type. That is, (first) separator 30, negative electrode 20, (second) separator 30, and positive electrode 10 are layered in this order, and are spirally wound to form electrode assembly 50. However, the winding type is exemplary. Electrode assembly 50 can have any structure. Electrode assembly 50 may be, for example, a stack type.

<<Negative Electrode>>

Figure 5:
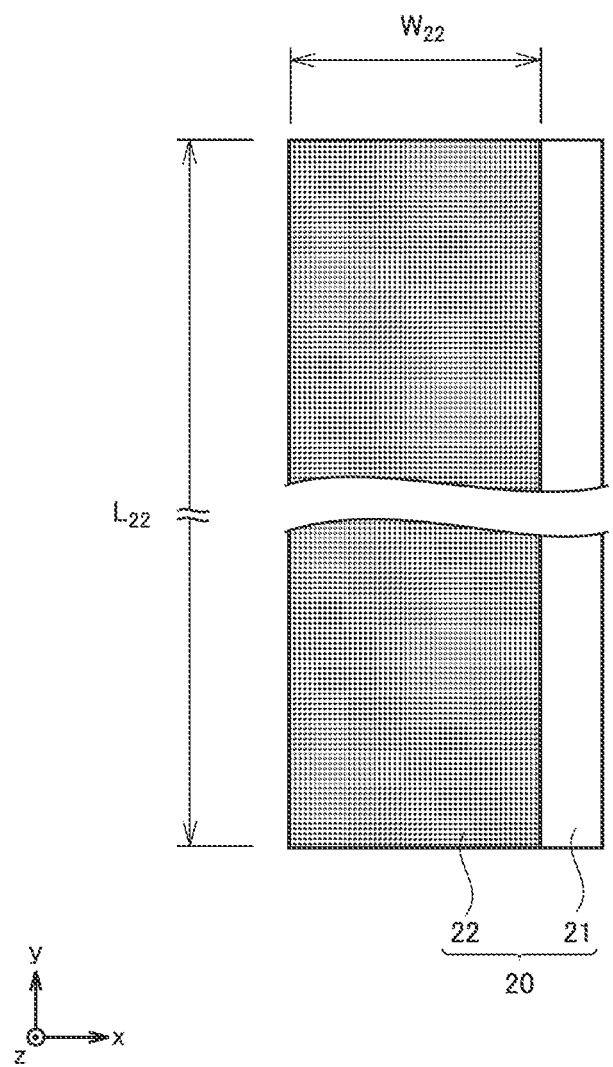
FIG. 5 is a schematic plan view showing an exemplary negative electrode in the present embodiment.

FIG. 5 is a schematic plan view showing an exemplary negative electrode in the present embodiment.

Negative electrode 20 is a sheet in the form of a strip. Negative electrode 20 includes a negative electrode substrate 21 and a negative electrode active material layer 22. Negative electrode substrate 21 may be, for example, a copper (Cu) foil or the like. Negative electrode substrate 21 may also be referred to as, for example, a core body, a current collector, or the like. Negative electrode active material layer 22 is disposed on a surface of negative electrode substrate 21. Negative electrode active material layer 22 may be disposed on only one surface of negative electrode substrate 21. Negative electrode active material layer 22 may be disposed on each of front and rear surfaces of negative electrode substrate 21. Negative electrode active material layer 22 has larger width ($W_{22}$) and length ($L_{22}$) than those of a positive electrode active material layer 12 (described later).

A portion of negative electrode substrate 21 is exposed from negative electrode active material layer 22. Hereinafter, the exposed portion of negative electrode substrate 21 is also referred to as "negative electrode substrate exposed portion". The negative electrode substrate exposed portion is disposed at one end portion in a short side direction (x axis direction in FIG. 5). The negative electrode substrate exposed portion extends in a long side direction (y axis direction in FIG. 5). The negative electrode substrate exposed portion can be used for connection between electrode assembly 50 and negative electrode terminal 92.

Negative electrode active material layer 22 includes a negative electrode active material. Negative electrode active material layer 22 may consist essentially of the negative electrode active material. Negative electrode active material layer 22 may further include, for example, a conductive material, a binder, and the like in addition to the negative electrode active material.

The negative electrode active material may be, for example, a group of particles (powder). The negative electrode active material includes graphite. The negative electrode active material may consist essentially of graphite. The graphite is preferably natural graphite. However, the graphite may be artificial graphite. The negative electrode active material can further include any component as long as the graphite is included therein. For example, in addition to the graphite, the negative electrode active material may further include at least one selected from a group consisting of soft carbon, hard carbon, silicon, silicon oxide, a silicon-based alloy, tin, tin oxide, a tin-based alloy, and $Li_4Ti_5O_{12}$. In the negative electrode active material, the graphite may have a mass fraction of, for example, 80% to 100%.

The conductive material can include any component. For example, the conductive material may include at least one selected from a group consisting of acetylene black, a vapor-grown carbon fiber, and a carbon nanotube. A blending amount of the conductive material may be, for example, 0.1 part by mass to 10 parts by mass with respect to 100 parts by mass of the negative electrode active material. The binder can include any component. For example, the binder may include at least one selected from a group consisting of a styrene-butadiene rubber (SBR), a carboxymethyl cellulose (CMC), and a polyacrylic acid (PAA). A blending amount of the binder may be, for example, 0.1 part by mass to 10 parts by mass with respect to 100 parts by mass of the negative electrode active material.

<<Positive Electrode>>

Figure 6:
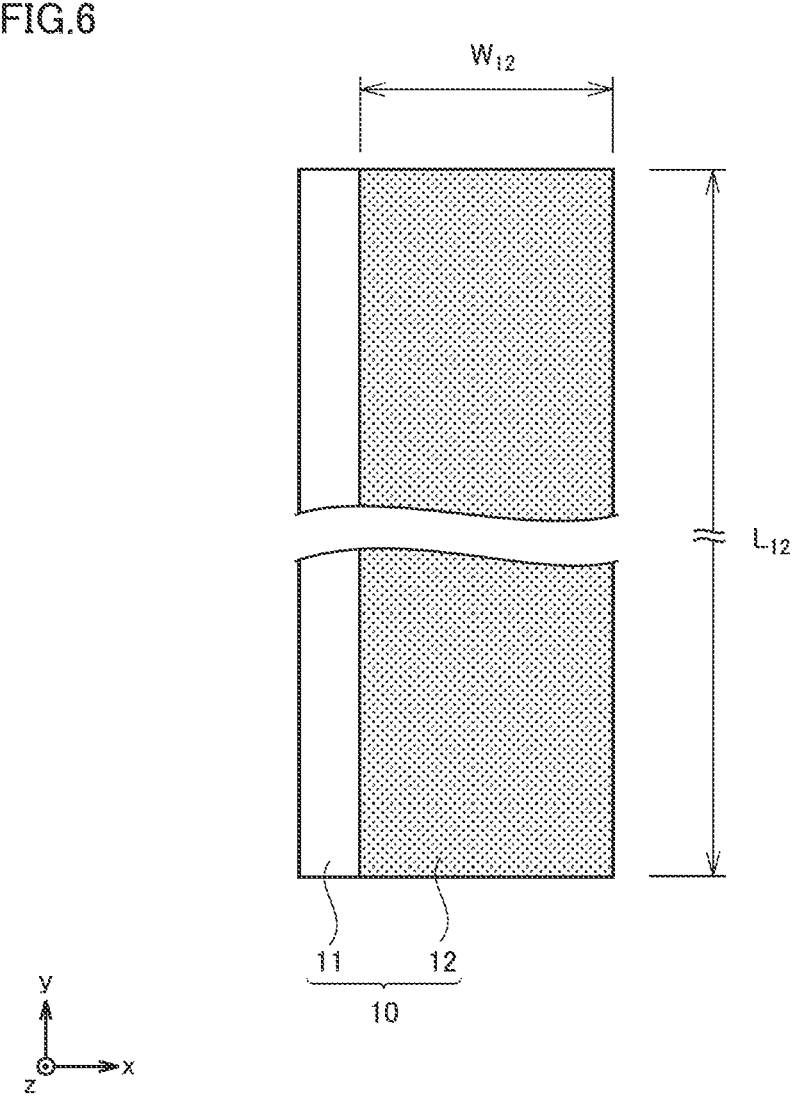
FIG. 6 is a schematic plan view showing an exemplary positive electrode in the present embodiment.

FIG. 6 is a schematic plan view showing an exemplary positive electrode in the present embodiment.

Positive electrode 10 is a sheet in the form of a strip. Positive electrode 10 includes a positive electrode substrate 11 and a positive electrode active material layer 12. Positive electrode substrate 11 may be, for example, an aluminum (Al) foil or the like. Positive electrode active material layer 12 is disposed on a surface of positive electrode substrate 11. A portion of positive electrode substrate 11 is exposed from positive electrode active material layer 12. Hereinafter, the exposed portion of positive electrode substrate 11 is also referred to as "positive electrode substrate exposed portion". The positive electrode substrate exposed portion is disposed at one end portion in the short side direction (x axis direction in FIG. 6). The positive electrode substrate exposed portion extends in the long side direction (y axis direction in FIG. 6). The positive electrode substrate exposed portion can be used for connection between electrode assembly 50 and positive electrode terminal 91.

Positive electrode active material layer 12 includes a positive electrode active material. The positive electrode active material can include any component. For example, the positive electrode active material may include at least one selected from a group consisting of $LiCoO_2$, $LiNiO_2$, $LiMnO_2$, $LiMn_2O_4$, $Li(NiCoMn)O_2$, $Li(NiCoAl)O_2$, and $LiFePO_4$. Here, for example, a description such as "(NiCoMn)" in a composition formula such as "Li(NiCoMn)$O_2$" indicates that the total of the composition ratios in the parentheses is 1. Positive electrode active material layer 12 may further include, for example, a conductive material, a binder, and the like in addition to the positive electrode active material. The conductive material can include any component. The conductive material may include acetylene black or the like, for example. A blending amount of the conductive material may be, for example, 0.1 part by mass to 10 parts by mass with respect to 100 parts by mass of the positive electrode active material. The binder can include any component. For example, the binder can include polyvinylidene difluoride (PVDF) or the like. A blending amount of the binder may be, for example, 0.1 part by mass to 10 parts by mass with respect to 100 parts by mass of the positive electrode active material.

<<Separator>>

Electrode assembly 50 may include two separators 30, for example. Electrode assembly 50 may solely include one separator 30, for example. Separator 30 has an electrically insulative property. At least a portion of separator 30 is interposed between positive electrode 10 and negative electrode 20. Separator 30 separates positive electrode 10 and negative electrode 20 from each other. Separator 30 is a porous sheet in the form of a strip. Separator 30 may be composed of, for example, polyolefin. Separator 30 may be composed of, for example, polyethylene, polypropylene, or the like. For example, a ceramic particle layer or the like may be formed on a surface of separator 30.

<<Electrolyte Solution>>

Electrode assembly 50 is impregnated with at least part of the electrolyte solution. Electrode assembly 50 may be impregnated with a whole of the electrolyte solution. Electrode assembly 50 may be impregnated with part of the electrolyte solution. Part of the electrolyte solution may be stored outside electrode assembly 50. The electrolyte solution is a liquid electrolyte. The electrolyte solution includes a solvent and a supporting electrolyte. The solvent is aprotic. The solvent can include any component. For example, the solvent may include at least one selected from a group consisting of ethylene carbonate (EC), propylene carbonate (PC), ethyl methyl carbonate (EMC), dimethyl carbonate (DMC), and diethyl carbonate (DEC). The supporting electrolyte is dissolved in the solvent. The supporting electrolyte can include any component. For example, the supporting electrolyte may include at least one selected from a group consisting of $LiPF_6$, $LiBF_4$, $LiN(FSO_2)_2$, and $LiB(C_2O_4)_2$. For example, the electrolyte solution may further include an additive or the like in addition to the solvent and the supporting electrolyte. The additive may include vinylene carbonate (VC) or the like, for example.

<Capacity Configuration>

In the present embodiment, the following relation of a formula (1) is satisfied:

$$1.60 \leq NPR/AAR \leq 2.55 \quad (1).$$

In the formula (1), the positive/negative capacity ratio "NPR" represents a ratio of the negative electrode charging capacity (hereinafter, also referred to as "QCa") to the positive electrode charging capacity (hereinafter, also referred to as "QCc"). The negative electrode effective utilization ratio "AAR" represents a ratio of an effective discharging capacity (hereinafter, also referred to as "QDa") of negative electrode 20 to a total of a capacity (hereinafter, also referred to as "QI") corresponding to an amount of inactive Li adhered to negative electrode 20 and the effective discharging capacity "QDa" of negative electrode 20. Hereinafter, the "capacity corresponding to the amount of inactive Li adhered to the negative electrode" is also referred to as "irreversible capacity".

With the relation of the formula (1) being satisfied, it is considered that the graphite included in negative electrode 20 can be in the second stage structure ($St_2$) when battery 100 has an SOC of 70% to 90%. In other words, battery 100 is configured such that the graphite is in the second stage structure ($St_2$) when the SOC is 70% to 90%.

"NPR/AAR" may be more than or equal to 1.62, for example. "NPR/AAR" may be more than or equal to 1.63, for example. "NPR/AAR" may be more than or equal to 2.02, for example. "NPR/AAR" may be less than or equal to 2.53, for example. "NPR/AAR" may be less than or equal to 2.02, for example. "NPR/AAR" may be more than or equal to 1.60 and less than or equal to 2.02, for example. "NPR/AAR" may be more than or equal to 1.62 and less than or equal to 2.02, for example. "NPR/AAR" may be more than or equal to 1.63 and less than or equal to 2.02, for example.

In the present embodiment, for example, the following relations of formulae (2) and (3) may be further satisfied:

$$1.45 \leq NPR \leq 1.90 \quad (2); \text{ and}$$

$$0.75 \leq AAR \leq 0.90 \quad (3).$$

In the present embodiment, for example, the following relations of formulae (4) and (5) may be further satisfied:

$$1.05 \leq NPR \leq 1.40 \quad (4); \text{ and}$$

$$0.55 \leq AAR \leq 0.65 \quad (5).$$

In the present embodiment, for example, the following relations of formulae (6) and (7) may be further satisfied:

$$1.46 \leq NPR \leq 1.68 \quad (6); \text{ and}$$

$$0.83 \leq AAR \leq 0.90 \quad (7).$$

In the present embodiment, for example, the following relations of formulae (8) and (9) may be further satisfied:

$$1.68 \leq NPR \leq 1.90 \quad (8); \text{ and}$$

$$0.75 \leq AAR \leq 0.83 \quad (9).$$

The following describes a method of measuring each parameter used in the formulae (1) to (9).

In the present embodiment, the "charging upper limit voltage" and "discharging lower limit voltage" in the charging/discharging are merely for the sake of reference. Each of the charging upper limit voltage and the discharging lower limit voltage may be appropriately changed in accordance with a specification of the battery and the like. In the present embodiment, the charging/discharging is performed under a temperature environment of "25° C. (±1° C.)" unless otherwise stated particularly. In the present embodiment, the symbol "It" represents an hour rate. With a current of 1 It, a capacity corresponding to an SOC of 100% is discharged in one hour. In the present embodiment, "CCCV" represents a constant-current constant-voltage mode, "CC" represents a constant current mode, and "CV" represents a constant voltage mode. "V (vs. Li/Li$^+$)" indicates that the reference value (0 V) of the potential is the standard electrode potential of Li.

(Positive Electrode Charging Capacity "QCc")

The positive electrode charging capacity "QCc" is calculated based on a result of charging/discharging of a single-electrode cell. A procedure for producing the single-electrode cell is as follows. With a current of 1 It, battery 100 is CC-discharged to 2.5 V. Accordingly, the SOC of battery 100 is adjusted to 0%.

After the discharging, battery case 90 is opened to collect electrode assembly 50. By disassembling electrode assembly 50, positive electrode 10 is collected. By performing a cutting process or the like to positive electrode 10, a working electrode for the single-electrode cell is produced.

Figure 7:
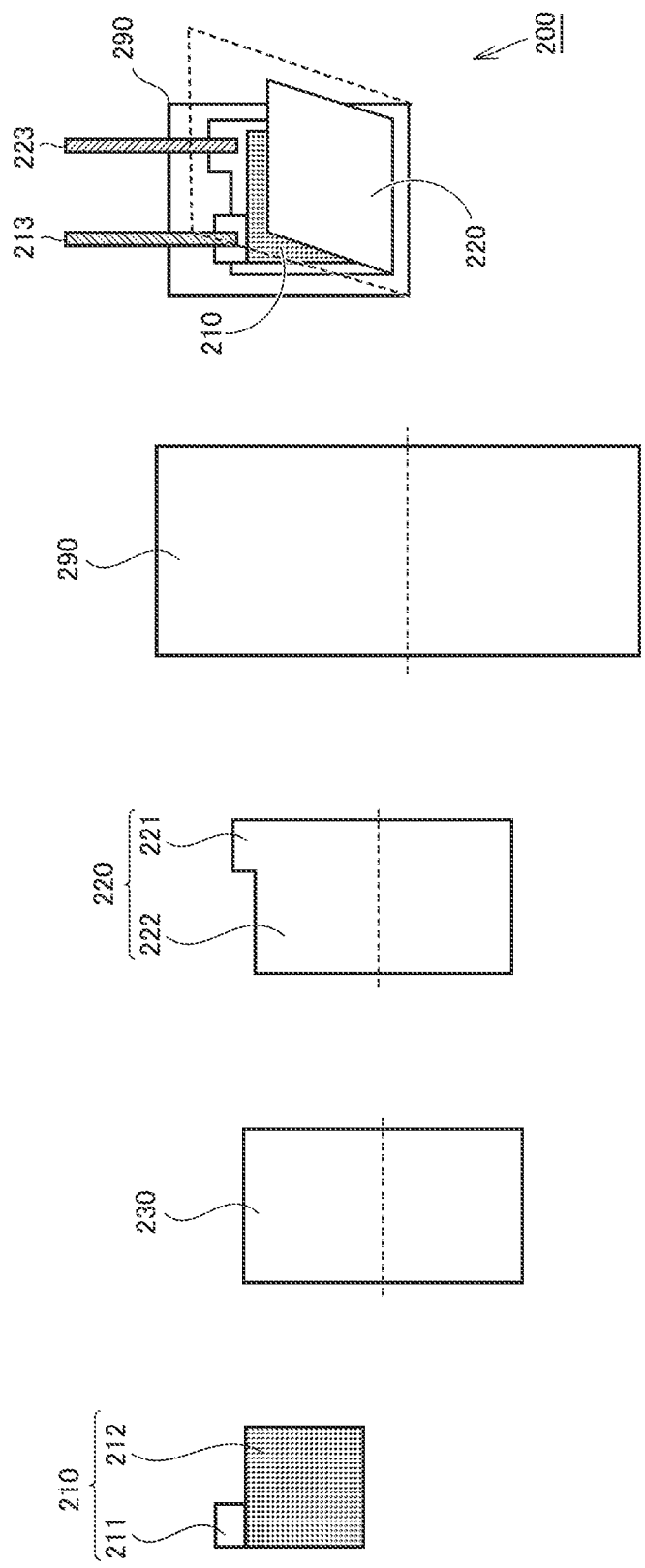
FIG. 7 is a schematic diagram showing a configuration of a single-electrode cell.

FIG. 7 is a schematic diagram showing a configuration of the single-electrode cell.

A single-electrode cell 200 includes a working electrode 210, a separator 230, a counter electrode 220, and an exterior member 290. Working electrode 210 includes a first tab joining portion 211 and an active material portion 212. First tab joining portion 211 is constituted of the electrode substrate. Active material portion 212 is constituted of the electrode active material layer. A metal tab 213 is joined to first tab joining portion 211. When working electrode 210 is positive electrode 10, metal tab 213 is an aluminum (Al) tab. Separator 230 is a porous sheet having an insulative property. Separator 230 is folded back at a position indicated by a dotted line to enclose working electrode 210. Counter electrode 220 is a Li foil. Counter electrode 220 includes a second tab joining portion 221 and a facing portion 222. A nickel (Ni) tab 223 is joined to second tab joining portion 221. Facing portion 222 faces active material portion 212. Facing portion 222 is folded back at a position indicated by a dotted line to enclose active material portion 212 with separator 230 being interposed therebetween. Exterior member 290 is an Al laminate film. Exterior member 290 is folded back at a position indicated by a dotted line to enclose working electrode 210, separator 230, and counter electrode 220. After exterior member 290 is folded back at the position indicated by the dotted line, the peripheral edge of exterior member 290 is thermally welded by a heat sealer with a portion thereof being not thermally welded. From the portion not thermally welded, the electrolyte solution is injected into exterior member 290. The electrolyte solution includes 1 mol/l of $LiPF_6$ and 0.1 mol/l of $LiB(C_2O_4)_2$. After the injection of the electrolyte solution, exterior member 290 is sealed by the heat sealer.

When working electrode 210 is positive electrode 10, the respective members have the following planar dimensions. However, in the present embodiment, the dimension of each of the members for single-electrode cell 200 is for the sake of reference. For example, the planar dimension of active material portion 212 or the like may be changed in accordance with the planar dimension or the like of the electrode active material layer (positive electrode active material layer 12 or negative electrode active material layer 22) as long as measurement is performed precisely as much as possible.

Working electrode 210 (active material portion 212): 30 mm×40 mm

Separator 230: 58 mm×120 mm

Counter electrode 220 (facing portion 222): 40 mm×106 mm

Exterior member 290: 80 mm×170 mm

When working electrode 210 is positive electrode 10, single-electrode cell 200 is charged/discharged in the following procedure.

With a current of 1/20 It, single-electrode cell 200 is CC-discharged to 2.5 V (vs. $Li/Li^+$). After a rest of 10 minutes after the discharging, single-electrode cell 200 is further CC-discharged to 2.5 V (vs. $Li/Li^+$) with a current of 1/40 It. Next, single-electrode cell 200 is CC-charged to 4.25 V (vs. $Li/Li^+$) with a current of 1/20 It. The charging capacity on this occasion is divided by the mass of the positive electrode active material included in working electrode 210, thereby calculating a charging capacity "$Q_{12}$" per mass of the positive electrode active material.

The positive electrode charging capacity "QCc" is calculated by the following formula (10):

$$QCc = Q_{12} \times W_{12} \times L_{12} \times M_{12} \times C_{12} \quad (10)$$

The meanings of the symbols in the formula (10) are as follows.

"$Q_{12}$" represents the charging capacity per mass of the positive electrode active material.

"$W_{12}$" represents the width of positive electrode active material layer 12 (see FIG. 6).

"$L_{12}$" represents the length of positive electrode active material layer 12 (see FIG. 6).

"$M_{12}$" represents the mass per unit area of positive electrode active material layer 12.

"$C_{12}$" represents the content of the positive electrode active material in positive electrode active material layer 12.

(Negative Electrode Charging Capacity "QCa")

The negative electrode charging capacity "QCa" is also calculated based on a result of charging/discharging of single-electrode cell 200. A measurement procedure is the same as that for the positive electrode charging capacity "QCc" except for the planar dimension of working electrode 210 and the charging/discharging procedure.

When working electrode 210 is negative electrode 20, working electrode 210 (active material portion 212) has the following planar dimension. Metal tab 213 is a Ni tab.

Working electrode 210 (active material portion 212): 35 mm×45 mm

When working electrode 210 is negative electrode 20, single-electrode cell 200 is charged/discharged in the following procedure.

With a current of 1/20 It, single-electrode cell 200 is CC-charged to 2.0 V (vs. $Li/Li^+$). After a rest of 10 minutes after the discharging, single-electrode cell 200 is further CC-charged to 2.0 V (vs. $Li/Li^+$) with a current of 1/40 It. Next, single-electrode cell 200 is CC-discharged to 0.001 V (vs. $Li/Li^+$) with a current of 1/20 It. The discharging capacity on this occasion is divided by the mass of the negative electrode active material included in working electrode 210, thereby calculating a charging capacity "$Q_2$" per mass of the negative electrode active material.

The negative electrode charging capacity "QCa" is calculated by the following formula (11):

$$QCa = Q_{22} \times W_{22} \times L_{22} \times M_{22} \times C_{22} \quad (11)$$

The meanings of the symbols in the formula (11) are as follows.

"$Q_{22}$" represents the charging capacity per mass of the negative electrode active material.

"$W_{22}$" represents the width of negative electrode active material layer 22 (see FIG. 5).

"$L_{22}$" represents the length of negative electrode active material layer 22 (see FIG. 5).

"$M_{22}$" represents the mass per unit area of negative electrode active material layer 22.

"$C_{22}$" represents the content of the negative electrode active material in negative electrode active material layer 22.

(Effective Discharging Capacity "QDa" of Negative Electrode)

The effective discharging capacity "QDa" is measured in battery 100. The SOC of battery 100 is adjusted to 100% by CCCV charging. A current during CC charging in the CCCV charging is 1 It. A voltage during CV charging in the CCCV charging is 4.15 V, and duration of the CV charging is 2.5 hours. After the charging, battery 100 is discharged to 2.5 V with a current of 1 It. The discharging capacity on this occasion is the effective discharging capacity "QDa" of negative electrode 20. The effective discharging capacity "QDa" of negative electrode 20 is considered to be equal to the full charging capacity (capacity corresponding to the SOC of 100%) of battery 100.

(Irreversible Capacity "QI")

During the initial charging of battery 100, parts of Li are inactivated and are adhered to the surface of negative electrode 20. The inactivated Li (inactive Li) then does not contribute to the charging/discharging reaction. That is, a capacity corresponding to the capacity of the inactive Li is an irreversible capacity. The irreversible capacity can be adjusted, for example, in accordance with an aging (high temperature storage) condition after the initial charging. The irreversible capacity "QI" is measured in the following procedure.

With a current of 1 It, battery 100 is CC-discharged to 2.5 V. Accordingly, the SOC of battery 100 is adjusted to 0%. After the discharging, battery case 90 is opened to collect electrode assembly 50. By disassembling electrode assembly 50, negative electrode 20 is collected. Two sample pieces are obtained from negative electrode 20 using a hole punch (inner diameter of 10 mm). The two sample pieces are rinsed by DMC. With this, the supporting electrolyte (salt) adhered to each sample piece is substantially removed. After the cleaning, negative electrode active material layer 22 (negative electrode composite material) is detached from the sample piece. The negative electrode composite material, about 10 ml of pure water, 5 ml of hydrochloric acid (35%), and 1 ml of hydrogen peroxide water are introduced into a beaker. The mixture is heated at 150° C. for 30 minutes. The mixture is filtered. The filtrate is introduced into a 100-ml volumetric flask. By adding pure water, the filtrate is diluted in the volumetric flask to 100 ml in total. In this way, a sample liquid is prepared. The sample liquid is analyzed by an ICP emission spectrophotometer. For example, the product name "ICPS-8100" manufactured by Shimadzu Corporation or an equivalent product may be used. In accordance with the intensity of a peak near a wavelength of 670 nm, Li is quantified. Three types of reference solutions each for a calibration curve are used which respectively have Li concentrations of 0 ppm, 1 ppm, and 2 ppm. Thus, the Li concentration of the sample liquid is measured. An area ratio of the whole of negative electrode active material layer 22 and the sample piece is calculated. In accordance with the Li concentration and the area ratio, the amount of inactive Li adhered to negative electrode 20 is calculated. In the present embodiment, the reaction of Li is regarded as a one-electron reaction. By multiplying the amount of inactive Li (unit: mol) by a Faraday constant, the amount of inactive Li is converted into an electric capacity (unit: Ah).

Figure 8:
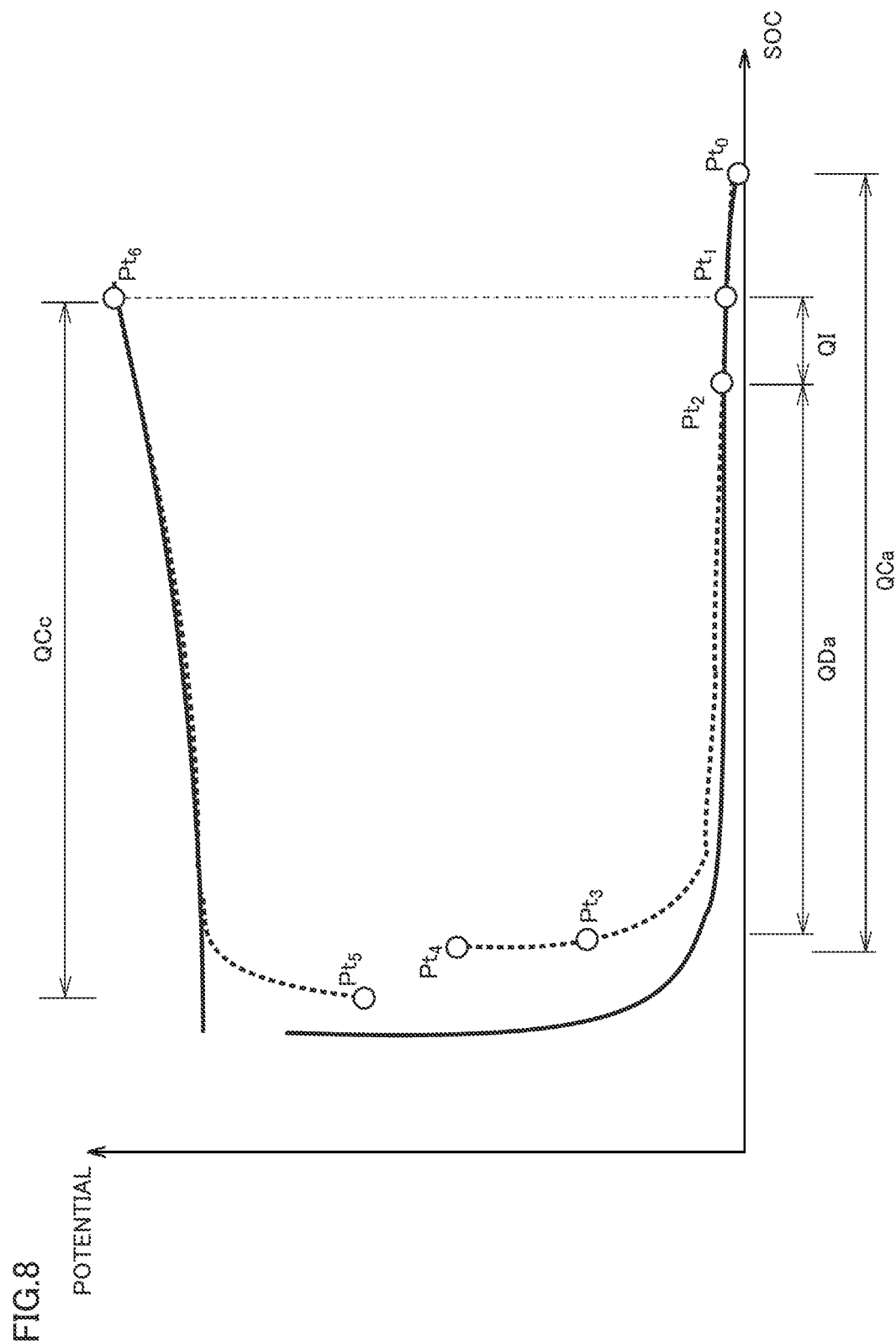
FIG. 8 is a graph showing a charging/discharging curve of the single-electrode cell.

FIG. 8 is a graph showing a charging/discharging curve of the single-electrode cell.

In FIG. 8, a capacity in a segment from a point ($Pt_0$) to a point ($Pt_4$) in transition of the potential of the negative electrode corresponds to the negative electrode charging capacity "QCa". A capacity in a segment from a point ($Pt_1$) to a point ($Pt_2$) corresponds to the irreversible capacity "QI". A capacity in a segment from the point ($Pt_2$) to a point ($Pt_3$) corresponds to the effective discharging capacity "QDa" of the negative electrode. A capacity in a segment from a point ($Pt_5$) to a point ($Pt_6$) in transition of the potential of the positive electrode corresponds to the positive electrode charging capacity "QCc".

(Correspondence Between Charging Stage Structure of Graphite and SOC of Battery)

A correspondence between each charging stage structure of the graphite and the SOC of battery 100 can be confirmed in the following procedure. The SOC of battery 100 is adjusted to 100% by the CCCV charging. A current during the CC charging in the CCCV charging is 1 It. A voltage during the CV charging in the CCCV charging is 4.15 V, and the duration of the CV charging is 2.5 hours. After the charging, battery 100 is discharged to 2.5 V with a current of 1 It. Thus, a discharging curve is obtained.

At each point included in the discharging curve, an amount of change "ΔV" of the voltage and an amount of change "ΔQ" of the capacity are calculated. By dividing "ΔV" by "ΔQ", "dV/dQ" is calculated at each point.

Figure 9:
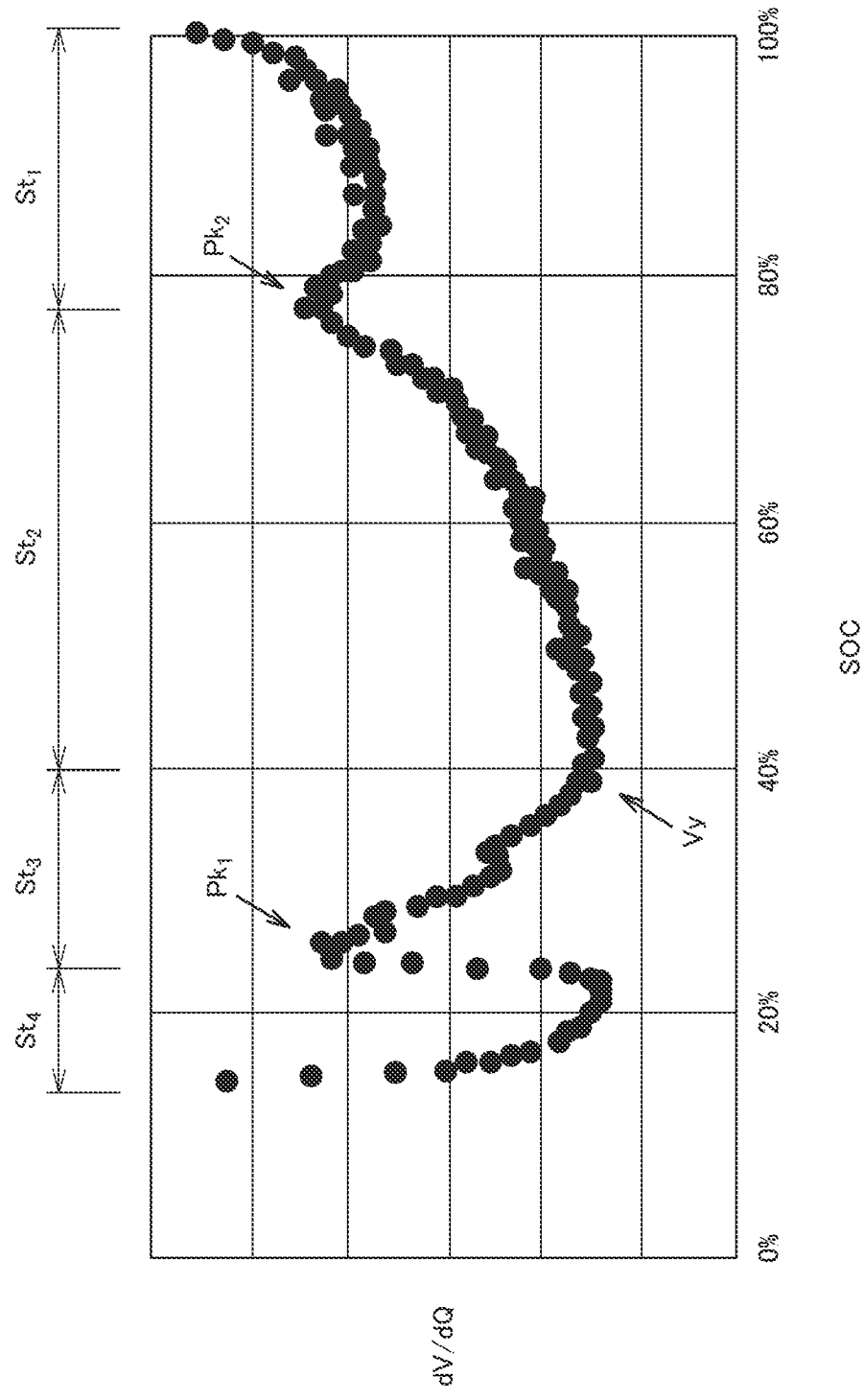
FIG. 9 is a graph showing an exemplary relation between dV/dQ and the SOC.

FIG. 9 is a graph showing an exemplary relation between dV/dQ and the SOC.

A dV/dQ curve is drawn by plotting "dV/dQ" with respect to the SOC. In the dV/dQ curve, the following peaks and valley are confirmed.

First peak ($Pk_1$): near the SOC of 20% to 30%
Valley (Vy): near the SOC of 40%
Second peak ($Pk_2$): near the SOC of 80%

It is considered that an SOC range lower than the first peak ($Pk_1$) corresponds to the fourth stage structure ($St_4$). It is considered that a range from the first peak ($Pk_1$) to the valley (Vy) corresponds to the third stage structure ($St_3$). It is considered that a range from the valley (Vy) to the second peak ($Pk_2$) corresponds to the second stage structure ($St_2$). It is considered that an SOC range higher than the second peak ($Pk_2$) corresponds to the first stage structure ($St_1$).

In the present embodiment, the upper limit of the SOC corresponding to the second stage structure ($St_2$) may be 140%, 112%, or 90%, for example. The lower limit of the SOC corresponding to the second stage structure ($St_2$) may be 44%, 45%, 56%, 69%, or 70%, for example.

EXAMPLES

The following describes an example of the present disclosure (hereinafter, also referred to as "the present example"). However, the description below does not limit the scope of claims.

<Manufacturing of Test Battery>

A test battery of the present example was manufactured in the following procedure.

A positive electrode slurry was prepared by mixing a positive electrode active material [$Li(NiCoMn)O_2$], a conductive material (acetylene black), a binder (PVDF), and a dispersion medium (N-methyl-2-pyrrolidone). The mass fraction of the positive electrode active material with respect to the total solid content was 90.0%. The positive electrode slurry was applied to a surface of a positive electrode substrate (Al foil) and was dried, thereby forming a positive electrode active material layer. Thus, a raw positive electrode was produced. The raw positive electrode was compressed and was cut into a predetermined size, thereby manufacturing a positive electrode.

A negative electrode slurry was prepared by mixing a negative electrode active material (natural graphite), a binder (CMC, SBR) and a dispersion medium (water). The mass fraction of the negative electrode active material with respect to the total solid content was 99%. The negative electrode slurry was applied to a surface of a negative electrode substrate (Cu foil) and was dried, thereby forming a negative electrode active material layer. Thus, a raw negative electrode was produced. The raw negative electrode was compressed and was cut into a predetermined size, thereby manufacturing a negative electrode.

A (first) separator, the negative electrode, a (second) separator and the positive electrode were layered in this order, and were spirally wound to form a cylindrical electrode assembly. The electrode assembly was shaped to have a flat shape. The electrode assembly was stored in a battery case (composed of an Al alloy). An electrolyte solution was injected into the battery case. The electrolyte solution included 1 mol/l of $LiPF_6$ and 0.1 mol/l of $LiB(C_2O_4)_2$. The electrode assembly was sufficiently immersed in the electrolyte solution. After the immersion, the battery was charged by a predetermined amount. After the charging, the battery case was sealed. In this way, a battery (nonaqueous electrolyte secondary battery) was manufactured.

The SOC of the battery was adjusted to 60%. The battery was stored for a predetermined time in a thermostatic chamber set at 75° C. That is, the battery was subjected to aging. After the aging, the initial capacity of the battery was measured.

In the present example, the negative electrode charging capacity "QCa" was adjusted by an amount of application (mass per unit area of the negative electrode active material layer). Further, the irreversible capacity "QI" was adjusted by an aging time.

<High-Rate Cycle Output Retention Ratio>

The SOC of the battery was adjusted to 50%. A discharging output (initial output) was measured by discharging the battery from the SOC of 50% for 10 seconds. After measuring the initial output, the SOC of the battery was adjusted to 90% with a current of 1 It. After adjusting the SOC, a high-rate cycle test under the following conditions was performed.

Discharging: discharging current=10 It; discharging capacity=capacity corresponding to the SOC of 20%

Charging: charging current=10 It; charging capacity=capacity corresponding to the SOC of 20%

Total charging/discharging time: 120 hours

There was no rest between the discharging and the charging, and the discharging and the charging were performed continuously.

A post-test output was measured in the same manner as the initial output during a period of 3 hours from the end of the high-rate cycle test. By dividing the post-test output by the initial output, the high-rate cycle output retention ratio was calculated. It is considered that as the high-rate cycle output retention ratio is higher, a temporarily decreased output after the high-rate charging/discharging is more suppressed.

<<NPR/AAR Map>>

In order to study a relation between "NPR/AAR" and the high-rate cycle output retention ratio, an NPR/AAR map, shown in FIG. 14, was created. In a region surrounded by a dotted-line in the NPR/AAR map of FIG. 14, the relation of the formula (1), "1.60≤NPR/AAR≤2.55", is satisfied.

<<First Test Group>>

In the NPR/AAR map, shown in FIG. 14, a first test group was extracted. As shown in FIG. 14, the first test group was extracted from a region surrounded by a solid line. Test configurations of the first test group are shown in Table 1 (below). In the first test group, No. 1 to No. 3 satisfy the relation of the formula (2), "1.45≤NPR≤1.90", and satisfy the relation of the formula (3), "0.75≤AAR≤0.90". Results of evaluations on the first test group are shown in Table 2.

TABLE 1

Test Configurations of First Test Group

| | | Negative Electrode Effective Utilization Ratio AAR = QDa/(QI + QDa) | | | | |
|---|---|---|---|---|---|---|
| NPR/AAR | | 0.70 | 0.75 | 0.83 | 0.90 | 0.95 |
| Positive/Negative Capacity Ratio NPR = QCa/QCc | 1.39 | 1.99 | 1.85 | 1.67 | 1.54 | 1.46 |
| | 1.46 | 2.09 | 1.95 | 1.76 | 1.62 | 1.54 |
| | 1.68 | 2.40 | 2.24 | 2.02 | 1.87 | 1.77 |
| | 1.90 | 2.71 | 2.53 | 2.29 | 2.11 | 2.00 |
| | 1.96 | 2.80 | 2.61 | 2.36 | 2.18 | 2.06 |
| Positive/Negative Capacity Ratio NPR = QCa/QCc | 1.39 | | | | No. 6 | (*1) |
| | 1.46 | | | | No. 3 | No. 7 |
| | 1.68 | | | No. 2 | | |
| | 1.90 | No. 4 | No. 1 | | | |
| | 1.96 | (*2) | No. 5 | | | |

TABLE 2

Results of Evaluations on First Test Group

| | No. 1 | No. 2 | No. 3 | No. 4 | No. 5 | No. 6 | No. 7 |
|---|---|---|---|---|---|---|---|
| Positive Electrode Charging Capacity "QCc"/Ah | 4.99 | 4.99 | 4.99 | 4.99 | 4.99 | 4.99 | 4.99 |
| Negative Electrode Charging Capacity "QCa"/Ah | 9.46 | 8.36 | 7.26 | 9.46 | 9.79 | 6.93 | 7.26 |
| NPR = QCa/QCc | 1.90 | 1.68 | 1.46 | 1.90 | 1.96 | 1.39 | 1.46 |
| 75° C. Aging Duration/h | 72 | 33 | 12 | 104 | 72 | 12 | 3 |
| Irreversible Capacity "QI"/Ah | 1.25 | 0.85 | 0.50 | 1.50 | 1.25 | 0.50 | 0.25 |
| Effective Discharging Capacity "QDa" of Negative Electrode/Ah | 3.74 | 4.14 | 4.49 | 3.49 | 3.74 | 4.49 | 4.74 |
| AAR = QDa/(QI + QDa) | 0.75 | 0.83 | 0.90 | 0.70 | 0.75 | 0.90 | 0.95 |
| NPR/AAR | 2.53 | 2.02 | 1.62 | 2.71 | 2.62 | 1.54 | 1.53 |
| Lower Limit of SOC Corresponding to $St_2$/% | 70 | 56 | 44 | 75 | 72 | 42 | 42 |
| Upper Limit of SOC Corresponding to $St_2$/% | 140 | 112 | 90 | 150 | 145 | 86 | 85 |
| High-Rate Cycle Output Retention Ratio/% | 80 | 90 | 70 | 50 | 50 | 40 | 40 |

Figure 10:
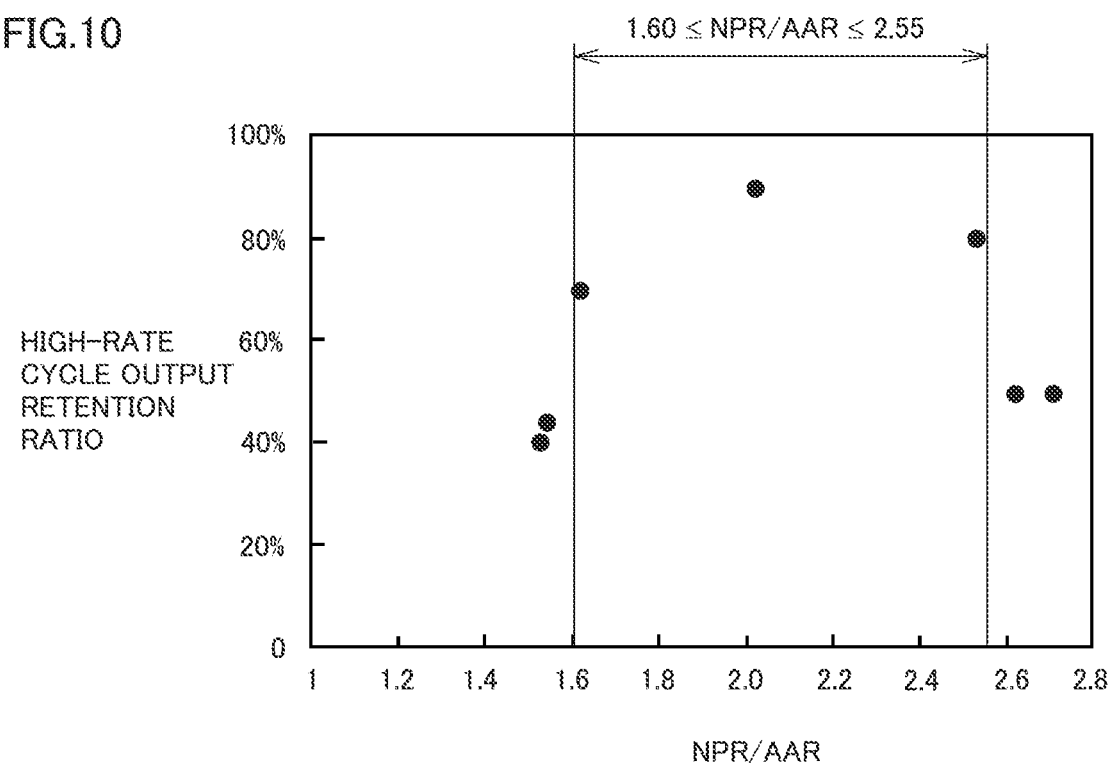
FIG. 10 is a graph showing a relation between "NPR/AAR" and a high-rate cycle output retention ratio in a first test group.

FIG. 10 is a graph showing the relation between "NPR/AAR" and the high-rate cycle output retention ratio in the first test group. In a range of "NPR/AAR" of more than or equal to 1.60 and less than or equal to 2.55, it is observed that the high-rate cycle output retention ratio tends to be significantly improved.

Figure 11:
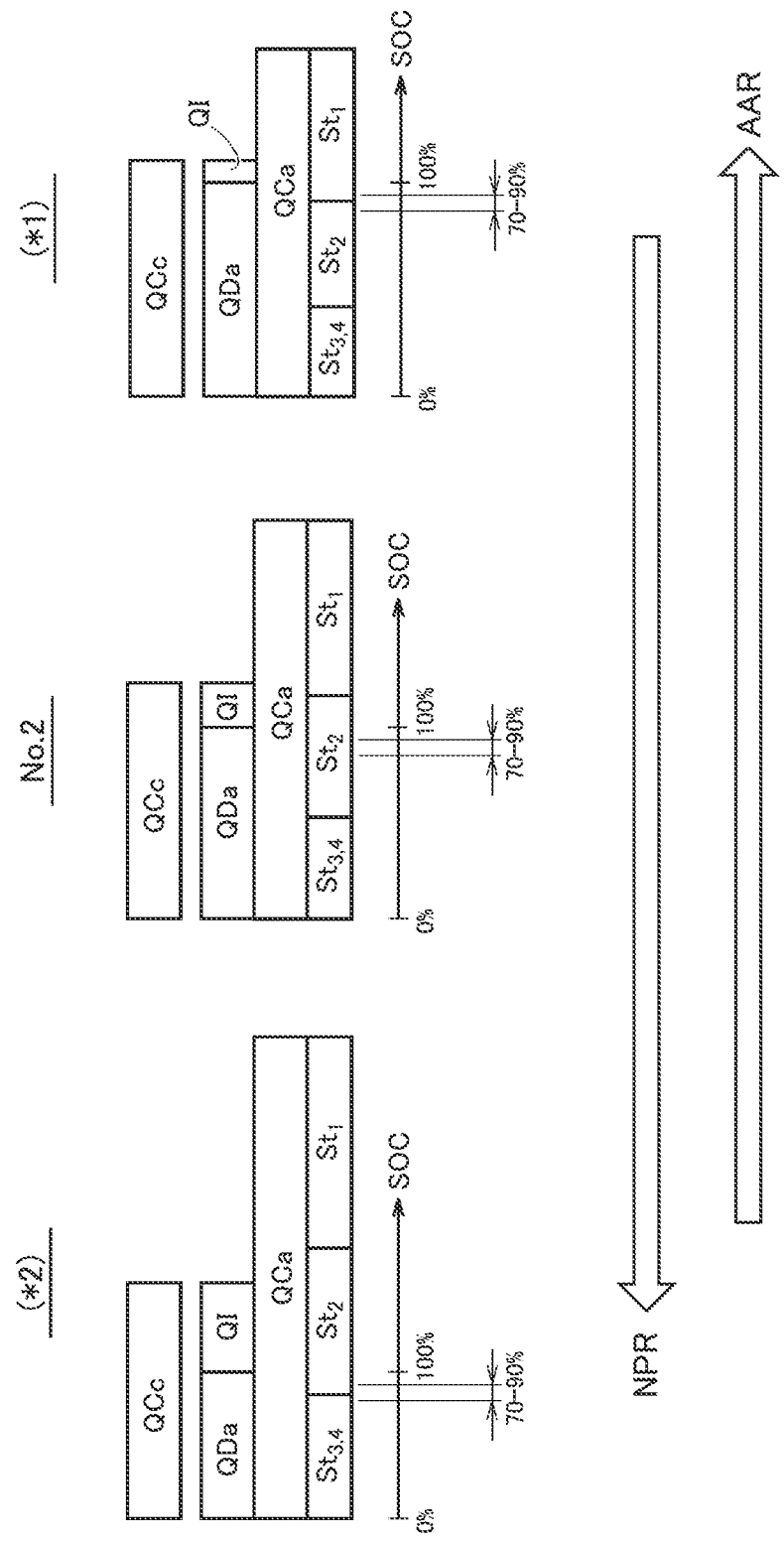
FIG. 11 is an explanatory diagram for capacity configurations in the first test group.

FIG. 11 is an explanatory diagram for the capacity configurations in the first test group.

FIG. 11 shows the capacity configurations of (*2), No. 2, and (*1) in Table 1. Each of the effective discharging capacities "QDa" of the negative electrodes is equal to an SOC of 100%. The magnitudes of "NPR" are expressed as follows: "(*2)>No. 2>(*1)". As "NPR" is larger, the second stage structure ($St_2$) is shifted to a higher SOC. The magnitudes of "AAR" are expressed as follows: "(*2)<No. 2<(*1)". As "AAR" is larger, the second stage structure ($St_2$) is shifted to a lower SOC. It is considered that the SOC range corresponding to the second stage structure ($St_2$) can be adjusted by a balance between "NPR" and "AAR".

<<Second Test Group>>

In the NPR/AAR map, shown in FIG. 14, a second test group was selected. As shown in FIG. 14, the second test group was selected from a region surrounded by a double solid line. Test configurations of the second test group are shown in Table 3. In the second test group, No. 8 and No. 9 satisfy the relation of the formula (4), "1.05≤NPR≤1.40", and satisfy the relation of the formula (5), "0.55≤AAR≤0.65". Results of evaluations on the second test group are shown in Table 4.

TABLE 3

Test Configurations of Second Test Group

| NPR/AAR | | Negative Electrode Effective Utilization Ratio AAR = QDa/(QI + QDa) | | | | |
|---|---|---|---|---|---|---|
| | | 0.50 | 0.55 | 0.60 | 0.65 | 0.70 |
| Positive/Negative Capacity Ratio NPR = QCa/Qcc | 1.01 | 2.02 | 1.84 | 1.68 | 1.55 | 1.44 |
| | 1.06 | 2.12 | 1.93 | 1.77 | 1.63 | 1.51 |
| | 1.25 | 2.50 | 2.27 | 2.08 | 1.92 | 1.79 |
| | 1.39 | 2.78 | 2.53 | 2.32 | 2.14 | 1.99 |
| | 1.46 | 2.92 | 2.65 | 2.43 | 2.25 | 2.09 |
| Positive/Negative Capacity Ratio NPR = QCa/Qcc | 1.01 | | | | No. 12 | (*3) |
| | 1.06 | | | | No. 9 | No. 13 |
| | 1.25 | | | (*4) | | |
| | 1.39 | No. 10 | No. 8 | | | |
| | 1.46 | (*5) | No. 11 | | | |

TABLE 4

Results of Evaluations on Second Test Group

| | No. 8 | No. 9 | No. 10 | No. 11 | No. 12 | No. 13 |
|---|---|---|---|---|---|---|
| Positive Electrode Charging Capacity "QCc"/Ah | 4.99 | 4.99 | 4.99 | 4.99 | 4.99 | 4.99 |
| Negative Electrode Charging Capacity "QCa"/Ah | 6.93 | 5.28 | 6.93 | 7.26 | 5.06 | 5.28 |
| NPR = QCa/Qcc | 1.39 | 1.06 | 1.39 | 1.46 | 1.01 | 1.06 |
| 75° C. Aging Duration/h | 234 | 142 | 289 | 234 | 142 | 104 |
| Irreversible Capacity "QI"/Ah | 2.24 | 1.75 | 2.49 | 2.24 | 1.75 | 1.50 |
| Effective Discharging Capacity "QDa" of Negative Electrode/Ah | 2.74 | 3.24 | 2.49 | 2.74 | 3.24 | 3.49 |
| AAR = QDa/(QI + QDa) | 0.55 | 0.65 | 0.50 | 0.55 | 0.65 | 0.70 |
| NPR/AAR | 2.53 | 1.63 | 2.78 | 2.65 | 1.56 | 1.51 |
| Lower Limit of SOC Corresponding to St$_2$/% | 69 | 45 | 76 | 73 | 43 | 42 |
| Upper Limit of SOC Corresponding to St$_2$/% | 140 | 90 | 154 | 147 | 87 | 84 |
| High-Rate Cycle Output Retention Ratio/% | 81 | 91 | 49 | 47 | 45 | 43 |

Figure 12:
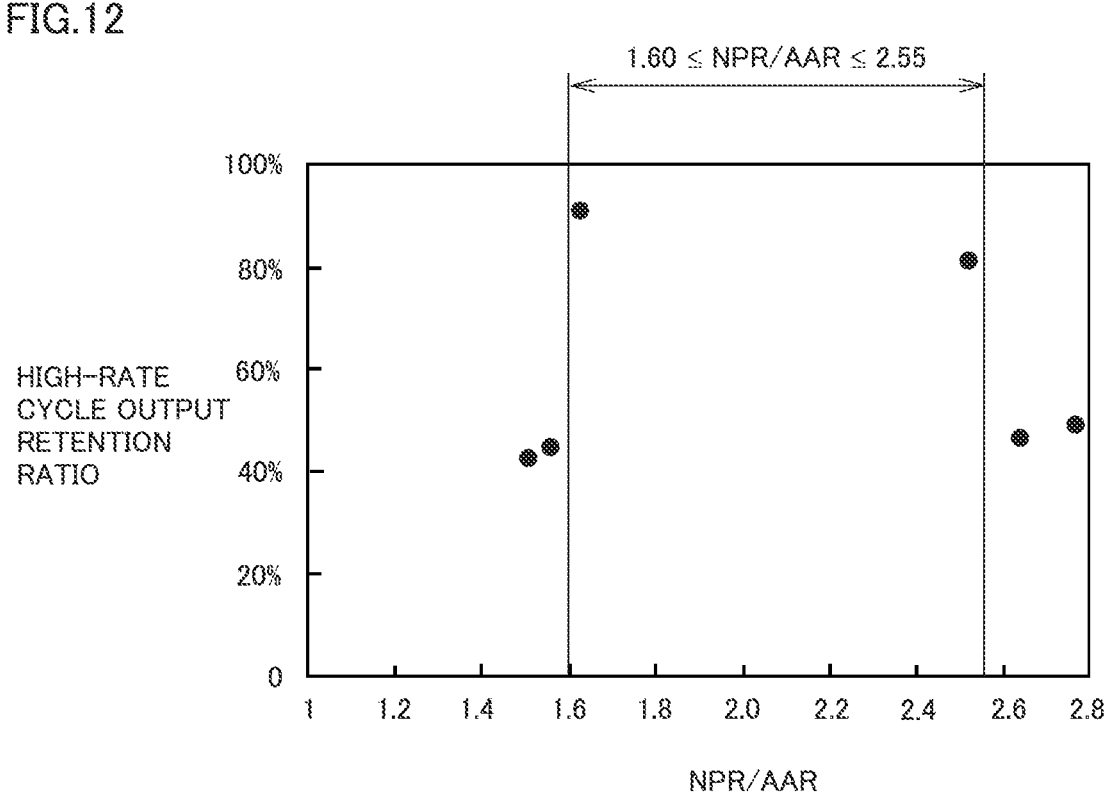
FIG. 12 is a graph showing a relation between "NPR/AAR" and a high-rate cycle output retention ratio in a second test group.

FIG. 12 is a graph showing a relation between "NPR/AAR" and the high-rate cycle output retention ratio in the second test group. In a range of the "NPR/AAR" of more than or equal to 1.60 and less than or equal to 2.55, it is observed that the high-rate cycle output retention ratio tends to be significantly improved.

Figure 13:
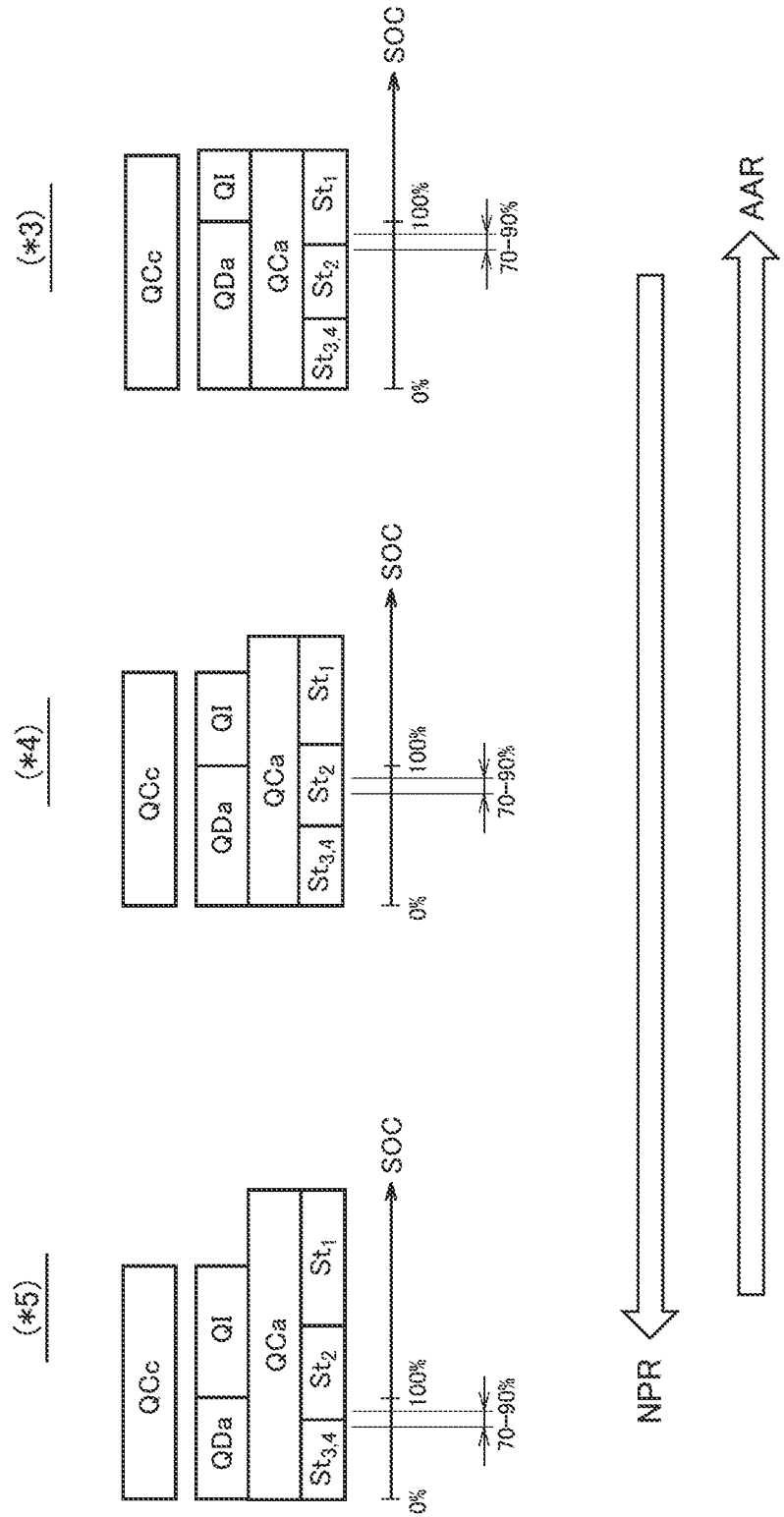
FIG. 13 is an explanatory diagram for capacity configurations in the second test group.

FIG. 13 is an explanatory diagram for the capacity configurations in the second test group.

FIG. 13 shows the capacity configurations of (*5), (*4), and (*3) in Table 3. Each of the effective discharging capacities "QDa" of the negative electrodes is equal to an SOC of 100%. The magnitudes of "NPR" are expressed as follows: "(*5)>(*4)>(*3)". As "NPR" is larger, the second stage structure (St$_2$) is shifted to a higher SOC. The magnitudes of "AAR" are expressed as follows: "(*5)<(*4)< (*3)". As "AAR" is larger, the second stage structure (St$_2$) is shifted to a lower SOC. It is considered that the SOC range corresponding to the second stage structure (St$_2$) can be adjusted by a balance between "NPR" and "AAR".

The present embodiment and the present example are illustrative in any respects. The present embodiment and the present example are not restrictive. For example, it is initially expected to extract freely configurations from the present embodiment and the present example and combine them freely.

The technical scope defined by the terms of the claims encompasses any modification within the meaning equivalent to the terms of the claims. The technical scope defined by the terms of the claims also encompasses any modification within the scope equivalent to the terms of the claims.

What is claimed is:

1. A nonaqueous electrolyte secondary battery, comprising:
   an electrode assembly; and
   an electrolyte solution, wherein
   the electrode assembly is impregnated with at least part of the electrolyte solution,
   the electrode assembly includes a positive electrode, a negative electrode, and a separator,
   the separator separates the positive electrode and the negative electrode from each other,
   the negative electrode includes a negative electrode active material,
   the negative electrode active material includes graphite, and
   the following relation of a formula (1) is satisfied:

$$1.60 \leq NPR/AAR \leq 2.55 \qquad (1),$$

where
   NPR represents a ratio of a negative electrode charging capacity to a positive electrode charging capacity, and
   AAR represents a ratio of an effective discharging capacity of the negative electrode to a total of a capacity corresponding to an amount of inactive lithium adhered to the negative electrode and the effective discharging capacity of the negative electrode, and wherein
   the following relations of formulae (2) and (3) are further satisfied:

$$1.45 \leq NPR \leq 1.90 \qquad (2); \text{ and}$$

$$0.75 \leq AAR \leq 0.90 \qquad (3).$$

2. A nonaqueous electrolyte secondary battery, comprising:
   an electrode assembly; and
   an electrolyte solution, wherein
   the electrode assembly is impregnated with at least part of the electrolyte solution,
   the electrode assembly includes a positive electrode, a negative electrode, and a separator,
   the separator separates the positive electrode and the negative electrode from each other,
   the negative electrode includes a negative electrode active material,
   the negative electrode active material includes graphite, and
   the following relation of a formula (1) is satisfied:

$$1.60 \leq NPR/AAR \leq 2.55 \qquad (1),$$

where
   NPR represents a ratio of a negative electrode charging capacity to a positive electrode charging capacity, and
   AAR represents a ratio of an effective discharging capacity of the negative electrode to a total of a capacity corresponding to an amount of inactive lithium adhered to the negative electrode and the effective discharging capacity of the negative electrode, and wherein
the following relations of formulae (4) and (5) are further satisfied:

$$1.05 \leq NPR \leq 1.40 \quad (4); \text{ and}$$

$$0.55 \leq AAR \leq 0.65 \quad (5).$$

* * * * *